Nov. 23, 1926.     1,607,989
E. M. KNIGHT
FILTERING DEVICE
Filed June 5, 1926
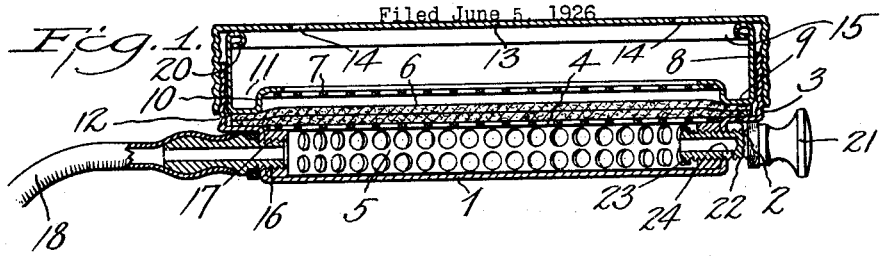
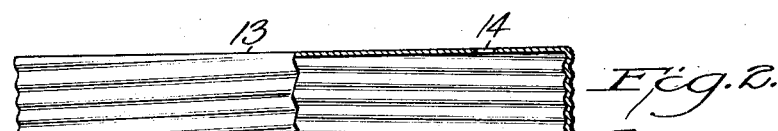
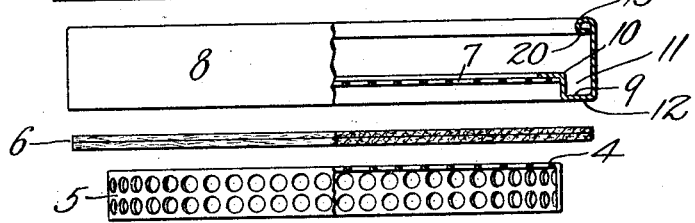
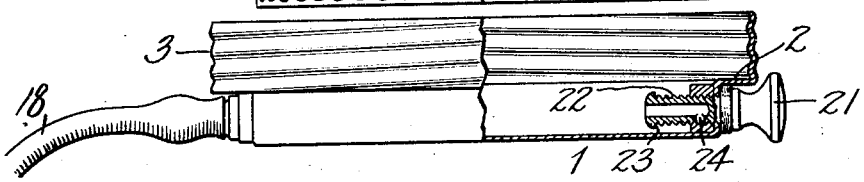
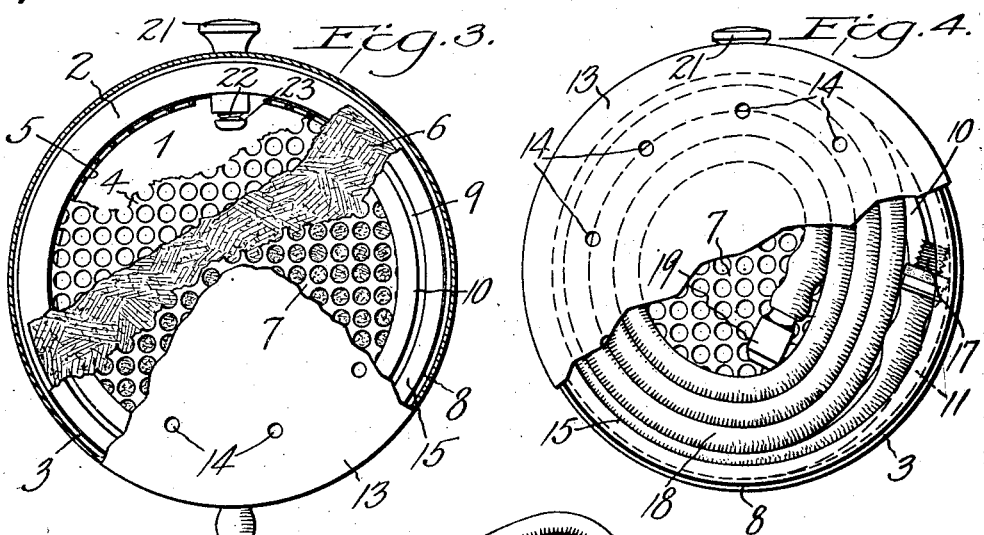
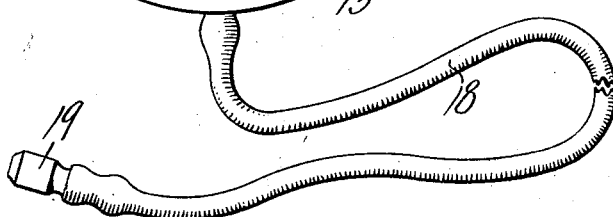
INVENTOR
Edward M. Knight
BY
Frederick W. Barker
ATTORNEY

UNITED STATES PATENT OFFICE.

EDWARD M. KNIGHT, OF BROOKLYN, NEW YORK.

FILTERING DEVICE.

Application filed June 5, 1926. Serial No. 113,838.

This invention relates to filtering devices such as are employed to purify water for drinking purposes, and my improvement is directed to a self contained apparatus of this character which is so compact and small in size that it is readily portable either by carrying in a pocket or in a small traveling kit, while being capable in use of supplying a steadily flowing stream of filtered water from any available source.

Briefly expressed, my improved filter comprises a shallow collecting base portion, which is covered by a suitable filtering medium, said base portion having means of connection for a flexible tube. A perforated disk, provided with a surrounding flange, fits within the base portion upon the filtering medium, to hold the latter in place, and a cover member, having water receiving apertures, screws upon the base portion to complete the enclosure. The space between the perforated disk and the cover member, bounded by the flange upon the disk, serves to contain the length of tubing forming a part of the apparatus, when packed for portage.

Other features and advantages of my invention will hereinafter appear.

Figure 1 is a side sectional view of my improved filter.

Fig. 2 is a group view in elevation, partly in section, of the several elements comprising the filter.

Fig. 3 is a top plan view of the filter, partly sectioned, with the tubing applied for service, and Fig. 4 is a similar view, showing the tubing coiled within the filter, for portage.

In said drawing let 1 indicate a shallow base receptacle for filtered water, said base being provided with a radial flange or shoulder 2, which is bounded by an annular, externally threaded wall 3. A perforated disk 4 is provided to cover the base receptacle in about the level of shoulder 2, constituting the upper boundary for the space which is to contain filtered water. For convenience, disk 4 is formed of sheet material having an annular down-turned flange 5 that may fit snugly within the base receptacle, thus forming in effect a table whose perforated top lies in about the same plane as shoulder 2.

The filtering medium, such for example as that disclosed in my Patent No. 1,571,417, dated February 2, 1926, is imposed upon the perforated disk 4, said filtering medium, here indicated at 6, also being circular in form and of such diameter as to overlie shoulder 2.

The filtering medium is to be covered by another perforated disk, here indicated at 7, so that it may be enclosed between two perforated disks, but disk 7 is to be spaced from the surface of the filtering medium, to allow the latter to swell or expand in its absorption of moisture.

Therefore the perforated disk 7 is carried by a ring that is angled in cross-section, the ring having the wall 8, with bottom, inturned flange 9, whose inner edge is upturned at 10 to provide engaging means for disk 7, and to also provide a concentric trough 11 within the confines of wall 8, for a purpose to be referred to hereinafter.

By reason of flange 9 having its inner edge upturned for engagement with disk 7, thereby said disk is located in a plane parallel with but spaced from the bottom surface 12 of flange 9, and therefore flange 9, when the ring is nested partway within wall 3 of the base receptacle, will clamp the edge portion of the filtering medium against shoulder 2, thereby firmly holding said medium in place and effecting a tight joint that precludes the passage of water into the base receptacle excepting by filtration through the filtering medium.

Pressure by which ring-flange 9 clamps the filtering medium against shoulder 2 is provided by a screw cap 13 that screws upon the threaded wall 3 of the base receptacle, the top of said cap, which is provided with water inlet apertures 14, bearing upon the peripheral edge 15 of the ring, which projects above wall 3, and thereby frictionally binding together the several associated filter elements.

It will be observed that the ring having wall 8 does not rotate in the clamping operation referred to, but is caused to press the filtering medium against shoulder 2 by reason of the pressure communicated thereto from cap 13 in the act of screwing said cap to the base receptacle. Therefore no rotating action occurs upon the filtering medium, but only direct pressure, and in consequence no tendency exists to disintegrate or disperse the filtering medium in the act of binding the filter elements together.

The wall 3 of the base receptacle is provided with a threaded aperture 16 for engagement by a screw tip 17 attached at one end of a length of tubing 18, which is to be used for drawing off the filtered water, said tube having a nozzle 19, that can be placed in the mouth of the user for starting a syphon by suction, the filter lying in the water requiring filtration.

The space in the filter between the disk 7 and cap 13 serves to contain the tubing 18 coiled, when not in use, the coil being conveniently formed by placing its first turn within the trough 11, previously referred to as formed between wall 8 of the ring, and the upturned edge 10. Also the peripheral edge 15 of wall 8 is inturned or overhung as at 20 to serve as retaining means to facilitate coiling of the tubing 18 in its lodgment space.

When emptying the filter preparatory to placing in the pocket or kit, after disengagement of the tubing 18 from aperture 16, a relief valve 21 is opened to permit water remaining in the base receptacle to flow out through said aperture.

This valve, in order that it may not be removable, has a threaded tubular portion 22, screwed through the wall 3 and provided with a fixed collar 23 that prevents its complete withdrawal. A lateral orifice 24 in the tubular portion 22 is enclosed within wall 3 when the valve is screwed inwardly, but upon unscrewing the valve thereby orifice 24 becomes exposed outside wall 3 and provides the necessary air vent through the valve which permits the water to run out through aperture 16.

Variations within the spirit and scope of my invention are equally comprehended by the foregoing disclosure.

I claim:

1. A filter comprising a receptacle having a threaded wall and provided with a radial shoulder within the confines of said wall, a perforated screw cap to engage said wall, a perforated disk supported in spaced relation from the base of said receptacle in the plane of said shoulder, a filtering medium lying upon said disk and shoulder, a ring nested partway within said wall, said ring having a bottom flange opposed to said shoulder, the inner edge of said flange being upturned to provide an annular trough, and a length of tubing having means of service connection with said receptacle, said tubing when not in use fitting coiled within said ring, with the outer turn of the coil lying within said trough.

2. A filter comprising a receptacle having a threaded wall and provided with a radial shoulder within the confines of said wall, a perforated screw cap to engage said wall, a perforated disk supported in spaced relation from the base of said receptacle in the plane of said shoulder, a filtering medium lying upon said disk and shoulder, a ring nested partway within said wall, said ring having a bottom flange opposed to said shoulder, and its top edge inturned to provide an overhung portion, and a length of tubing having means of service connection with said receptacle, said tubing when not in use fitting coiled within said ring with the outer turn of the coil lying beneath said overhung portion.

Executed this 4th day of June, 1926.

EDWARD M. KNIGHT.